US012580088B2

(12) United States Patent
Kim et al.

(10) Patent No.: US 12,580,088 B2
(45) Date of Patent: Mar. 17, 2026

(54) MICRO NUCLEAR REACTOR HAVING A HEAT PIPE EXTENDING INTO A CORE COMPRISING FUEL PARTICLES MIXED WITH MODERATOR PARTICLES, WHERE THE PARTICLES CAN BE GRAVITY DISCHARGED FROM THE CORE THROUGH A BOTTOM OUTLET

(71) Applicant: SEOUL NATIONAL UNIVERSITY R&DB FOUNDATION, Seoul (KR)

(72) Inventors: Eung Soo Kim, Seoul (KR); Hyung Jin Shim, Seoul (KR); Dokyun Kim, Seoul (KR); Young In Kim, Daejeon (KR); Dong Hyuk Lee, Seoul (KR); Young Beom Jo, Changwon-si (KR); Jin Woo Kim, Seoul (KR); Hoon Chae, Seoul (KR); Su-San Park, Busan (KR); Jinhyun Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 508 days.

(21) Appl. No.: 18/260,128

(22) PCT Filed: Sep. 28, 2021

(86) PCT No.: PCT/KR2021/013193
§ 371 (c)(1),
(2) Date: Nov. 17, 2023

(87) PCT Pub. No.: WO2022/145633
PCT Pub. Date: Jul. 7, 2022

(65) Prior Publication Data
US 2025/0292918 A1 Sep. 18, 2025

(30) Foreign Application Priority Data
Dec. 31, 2020 (KR) ........................ 10-2020-0189876

(51) Int. Cl.
*G21C 15/257* (2006.01)
*G21C 3/40* (2006.01)
(Continued)

(52) U.S. Cl.
CPC ............. *G21C 15/257* (2013.01); *G21C 3/40* (2013.01); *G21C 9/02* (2013.01); *G21C 9/024* (2013.01); *G21C 1/26* (2013.01); *G21D 3/04* (2013.01)

(58) Field of Classification Search
CPC .......... G21C 15/257; G21C 3/40; G21C 9/02; G21C 1/26; G21C 9/024; G21D 3/04
(Continued)

(56) References Cited

U.S. PATENT DOCUMENTS 3,302,042 A * 1/1967 Grover .................. G21C 15/02
376/321
5,408,510 A * 4/1995 Ball ......................... G21C 3/40
376/321
(Continued)

FOREIGN PATENT DOCUMENTS

DE 2945964 A1 * 5/1981 ............. G21C 15/18
JP 3905392 B2 4/2007

OTHER PUBLICATIONS

Yan, "The technology of micro heat pipe cooled reactor: A review", Annals of Nuclear Energy 135 (2020): 106948. (Year: 2020).*
(Continued)

*Primary Examiner* — Jack W Keith
*Assistant Examiner* — Daniel Wasil
(74) *Attorney, Agent, or Firm* — Westman, Champlin & Koehler, P.A.

(57) ABSTRACT

A micro nuclear reactor includes a core filled with nuclear fuel particles mixed with moderator particles. A heat pipe extends into the core and transfers heat generated by the
(Continued)

core. A power converter receives heat from the heat pipe and converts thermal energy into electrical energy. A valve is configured to open and close an outlet located at a lower portion of the core. When the valve is open the nuclear fuel and the moderator are discharged by gravity from the core through the outlet.

7 Claims, 4 Drawing Sheets

(51) Int. Cl.

| | |
|---|---|
| ***G21C 9/02*** | (2006.01) |
| *G21C 1/26* | (2006.01) |
| *G21D 3/04* | (2006.01) |

(58) Field of Classification Search

USPC .................................. 376/212, 321, 337, 367

See application file for complete search history.

(56) References Cited

U.S. PATENT DOCUMENTS

| | | | | |
|---|---|---|---|---|
| 10,643,756 | B2 | 5/2020 | McClure et al. | |
| 2015/0098544 | A1* | 4/2015 | Blanovsky ............... | G21C 1/28 376/348 |

OTHER PUBLICATIONS

Hernandez, "Micro heat pipe nuclear reactor concepts: Analysis of fuel cycle performance and environmental impacts", Annals of Nuclear Energy 126 (2019): 419-426. (Year: 2019).*

Hu, "Multi-physics simulations of heat pipe micro reactor", No. ANL-NSE-19/25. Argonne National Lab, 2019. (Year: 2019).*

Grabaskas, "Heat-Pipe Microreactors", Argonne National Laboratory (Mar. 2019). (Year: 2019).*

Wright, "Proposed design and operation of a heat pipe reactor using the Sandia National Laboratories annular core test facility and existing UZrH fuel pins", In AIP Conference Proceedings, vol. 746, No. 1, pp. 449-460. American Institute of Physics, 2005. (Year: 2005).*

International Search Report and Written Opinion in corresponding International Application No. PCT/KR2021/013193 dated Jan. 12, 2022.

Choi et al. "Conceptual Design of Reactor System for Hybrid Micro Modular Reactor (H-MMR) Using Potassium Heat Pipe", Nuclear Engineering and Design, Dec. 15, 2020, 10 pages, vol. 370.

Kim, C. and Lee, S. "Development of Key Technologies for Space Heat Pipe Reactor", Proceedings of the 2020 Fall Conference of the Korea Aerospace Society, Fall 2020, 6 pages.

Kim et al. "Development of Key Technologies for Korean Space Heat Pipe Reactor", Nuclear and Emerging Technologies for Space Conference Proceedings, Apr. 26-30, 2021, 4 pages.

Sun et al. "Conceptual Design and Analysis of a Multipurpose Micro Nuclear Reactor Power Source", Annals of Nuclear Energy, Nov. 2018, pp. 118-127, vol. 121.

* cited by examiner

MICRO NUCLEAR REACTOR HAVING A HEAT PIPE EXTENDING INTO A CORE COMPRISING FUEL PARTICLES MIXED WITH MODERATOR PARTICLES, WHERE THE PARTICLES CAN BE GRAVITY DISCHARGED FROM THE CORE THROUGH A BOTTOM OUTLET

CROSS-REFERENCE TO RELATED APPLICATION(S)

The present application is a § 371 national phase entry of International patent application Serial No. PCT/KR2021/013193, filed Sep. 28, 2021, and further claims priority to Korean application 10-2020-0189876, filed Dec. 31, 2020.

TECHNICAL FIELD

The disclosure relates to a micro nuclear reactor, and more particularly to a micro nuclear reactor which can provide stable power for at least several years through nuclear fission without separate refueling.

BACKGROUND ART

The existing fuels, batteries, and the like using fossil fuel are based on chemical energy, and thus only used for a short period of time due to limited capacity. In other words, the refueling of fuel and electricity is periodically required. This may be great restrictions to utilization under the conditions (space, the backwoods, the seabed, etc.) where fuel supply is not smooth for a long time.

Recently, as an alternative, there has been actively developed a micro (subminiature) reactor which is designed to operate for at least several years without replacing a nuclear fuel and thus utilized as power sources for many special purposes (space probes, power sources for backwoods, military drones, military submersibles, seabed exploring ships, exploration of resources, etc.).

The micro nuclear reactor has a small size of merely tens of centimeters to several meters, and is thus advantageous to increase stability during transportation.

Although the micro nuclear reactor is highly stable during transportation, it is important to maintain the integrity of the micro nuclear reactor for a long time even at high temperatures because irreversible damage is caused by exposure to radioactivity from nuclear fission.

SUMMARY

Accordingly, an aspect of the disclosure is to provide a micro nuclear reactor of which a core is formed of small particles to reduce thermal load to a structure thereof when expanded and contracted by temperature change, thereby enhancing stability even at high temperatures.

The problems to be solved in the disclosure are not limited to those mentioned above, and other problems not mentioned will become apparent to those skilled in the art from the following description.

According to an embodiment of the disclosure, there is provided a micro nuclear reactor including: a core filled with nuclear fuel and moderator which are formed of particles; a heat pipe inserted in the core and transferring outwards heat generated by a nuclear reaction; and a power converter receiving heat from a condenser of the heat pipe and converting thermal energy into electrical energy.

Here, the micro nuclear reactor may further include: an outlet located in a lower part of the core and discharging the nuclear fuel and the moderator out of the core; and a valve configured to open and close the outlet.

Here, the valve may be made of a material that melts upon reaching a predetermined temperature, and allows the nuclear fuel and the moderator to be discharged out of the core through the outlet to shut down the micro nuclear reactor.

Here, the micro nuclear reactor may further include a controller configured to control the valve to be opened and closed.

Here, the nuclear fuel and the moderator may be consisted of particles having two or more different sizes.

Here, the power converter may include one of the following: a thermoelectric generator using a thermoelectric element, a steam turbine generator, a gas turbine generator, or a Stirling engine.

Here, the micro nuclear reactor may further include a reflector disposed to surround the core and configured to reflect neutrons produced in the core.

Here, the micro nuclear reactor may further include a rotary control drum configured to rotate as disposed inside the reflector, and formed with a neutron absorber on one side thereof to absorb the neutrons and control a nuclear reaction output.

As described above, a micro nuclear reactor according to the disclosure employs a core composed of small particles, thereby having advantages that nuclear fuel is (re)loaded easily compared to block-shaped nuclear fuel, the nuclear fuel is moved to shut down the reactor by opening the valve without separately inserting a control rod, and decay heat is effectively removed.

Therefore, compared to a conventional micro nuclear reactor, a micro nuclear reactor according to the disclosure has advantages that the configuration is simple and stability is high even at higher temperatures.

Further, a micro nuclear reactor according to the disclosure is excellent in mobility based on miniaturization and is capable of stably supplying power for several years without additional refueling, thereby having an advantage of replacing the existing chemical energy-based fuel and battery that cannot be used for a long period of time due to low power capacity.

Further, when a thermoelectric generator using a thermoelectric element is used for a power conversion system, the system has no mechanical moving parts, thereby having advantages that reliability is high, no noise is produced, and operation and maintenance are easy.

Further, a micro nuclear reactor according to the disclosure has an advantage of being used as an energy source for various special-purpose equipment and devices such as space probes, power sources for backwoods, military drones, military submersibles, seabed exploring ships, exploration of resources, and space bases.

The present summary is provided only by way of example and not limitation. Other aspects of the present invention will be appreciated in view of the entirety of the present disclosure, including the entire text, claims, and accompanying figures.

Figure 1:
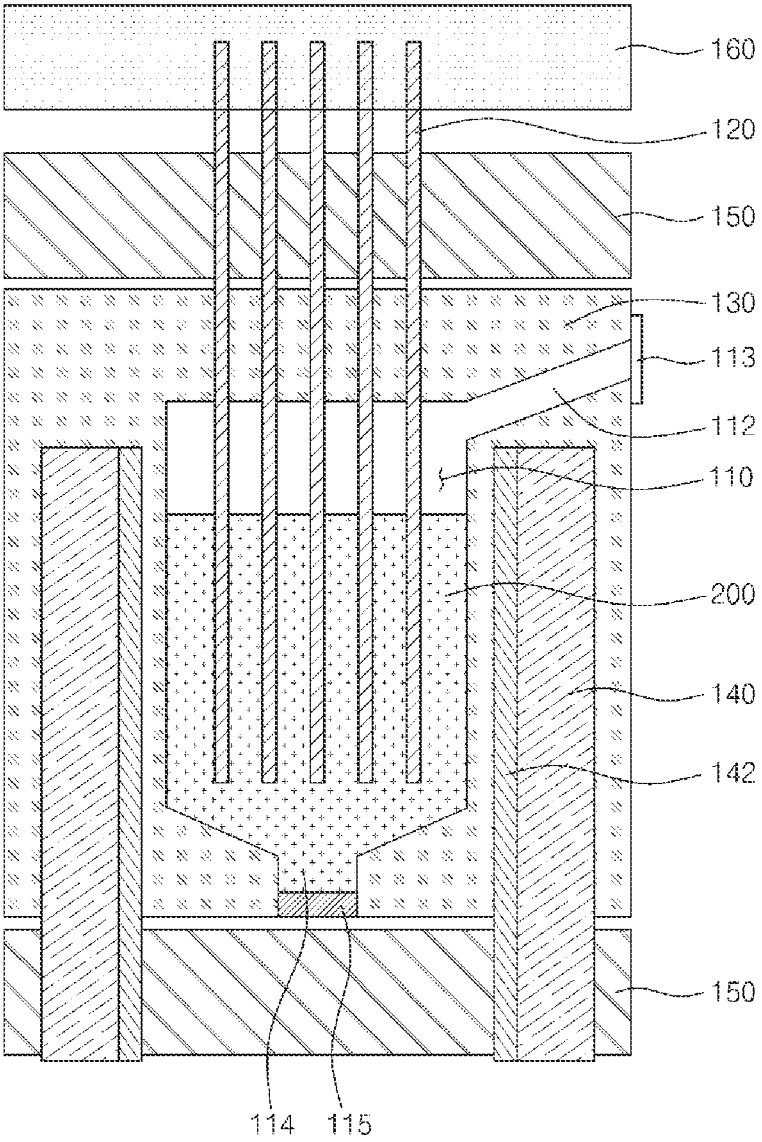
FIG. 1 is a longitudinal sectional view showing a configuration of a micro nuclear reactor according to an embodiment of the disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION OF ILLUSTRATIVE EMBODIMENTS

Details of embodiments are involved in the detailed description and the accompanying drawings.

The merits and features of the disclosure and methods of achieving the merits and features will become apparent from the following embodiments described in detail in conjunction with the accompanying drawings. However, the disclosure is not limited to the following embodiments, but may be implemented in various different ways. The embodiments are provided to merely complete the disclosure and allow a person having ordinary knowledge in the art to which the disclosure pertains to fully understand the scope of the disclosure. The disclosure is defined by the scope of the appended claims. Like reference numerals refer to like elements throughout the specification.

Hereinafter, the embodiments of the disclosure will be described with reference to the following drawings to illustrate a micro nuclear reactor.

Figure 2:
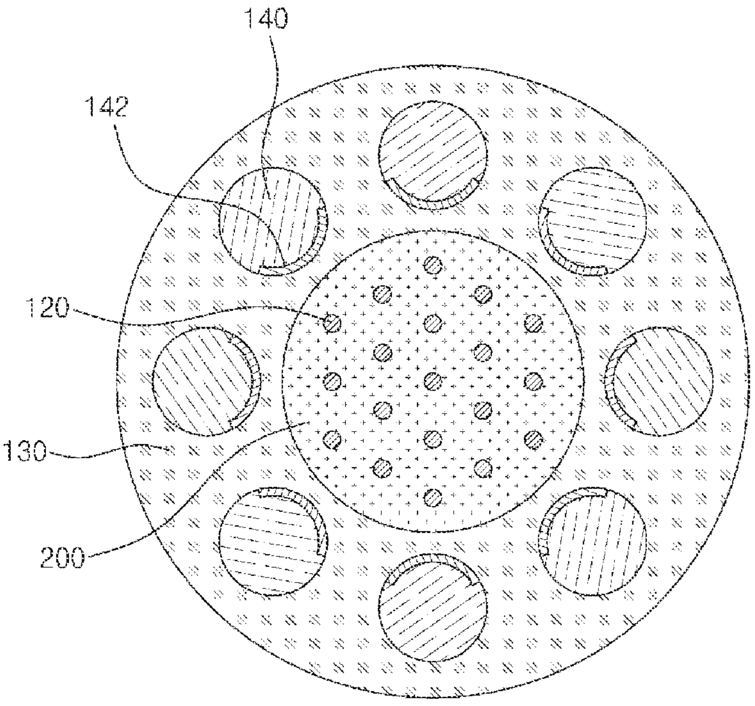
FIG. 2 is a cross sectional view of the micro nuclear reactor of FIG. 1.
Figure 3:
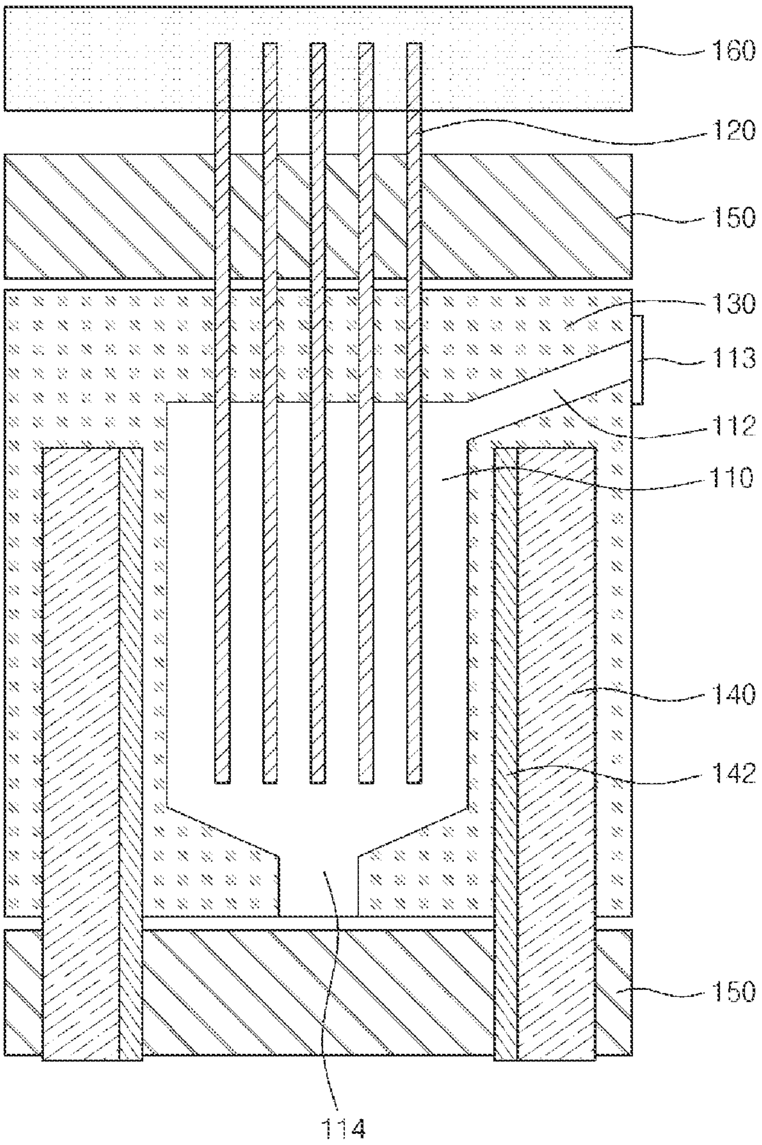
FIG. 3 illustrates a shutdown state of the reactor of FIG. 1.
Figure 4:
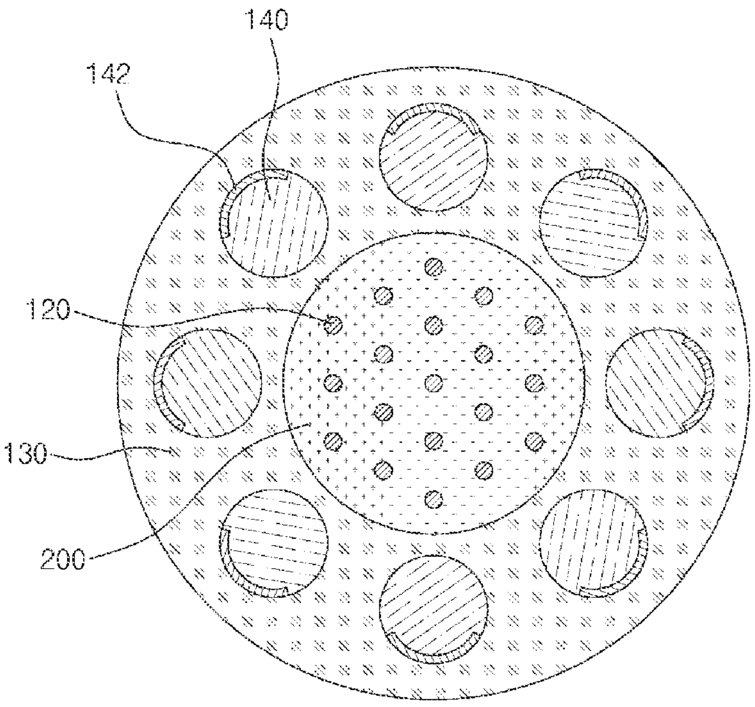
FIG. 4 illustrates an operation of a rotary drum for controlling a nuclear reaction output.

FIG. 1 is a longitudinal sectional view showing a configuration of a micro nuclear reactor according to an embodiment of the disclosure, FIG. 2 is a cross sectional view of the micro nuclear reactor of FIG. 1, FIG. 3 illustrates a shutdown state of the reactor of FIG. 1, and FIG. 4 illustrates an operation of a rotary drum for controlling a nuclear reaction output.

A micro nuclear reactor according to an embodiment of the disclosure may include a core 110, a heat pipe 120, and a power converter 160.

The core 110 is located at the center of the micro nuclear reactor, and is filled with nuclear fuel and a moderator 200 to cause nuclear fission. According to the disclosure, the core 110 is not in the form of a solid block but filled with the nuclear fuel and the moderator in the form of small particles such as sand.

In a conventional micro nuclear reactor using block-shaped nuclear fuel, mechanical stress may be applied to the reactor including the heat pipe due to thermal expansion of the block, thereby restricting output control. Therefore, the conventional micro nuclear reactor has safety issues because periodic maintenance is difficult when it is used as a power source for a special purpose.

The core 110 formed of particles as a granular matter exhibits characteristics of both solid and fluid. Therefore, unlike the core formed of the solid block, the core 110 formed of a millimeter-sized granular matter does not apply a mechanical thermal load to the structure when expanded and contracted by temperature change due to the dynamic (fluid) characteristics of the particles, thereby enhancing the structural stability of the micro nuclear reactor even at higher temperatures.

The nuclear fuel may be, but not limited to, TRISO powder triply coated with uranium dioxide (UO2). In the case of using such powder as the nuclear fuel, the micro nuclear reactor can operate even at a high temperature of about 1600° C. without damaging the structure.

In this case, the nuclear fuel and the moderator 200 may be consisted of particles having two or more different sizes. The nuclear fuel and the moderator 200 may each be formed of particles having different sizes. Alternatively, the nuclear fuel and the moderator 200 may each be formed of particles having a uniform size but the particle size of nuclear fuel and the particle size of moderator 200 may be different from each other. Such nuclear fuel and moderator 200 are filled in the core 110. When the nuclear fuel and the moderator 200 are formed of particles having two or more different sizes, the core 110 is decreased in porosity and increased in density, thereby improving a thermal efficiency of a nuclear reaction.

In an upper part of the core 110, an inlet 112 may be formed to fill the nuclear fuel and the moderator 200 in the core 110 therethrough, and a valve 113 may be formed in the inlet 112 to open and close the inlet 112. Therefore, the core 110 can be easily (re)loaded by opening the valve 113 and injecting therein the nuclear fuel and the moderator 200 formed of particles.

Further, in a lower part of the core 110, an outlet 114 is formed to discharge the nuclear fuel and the moderator 200 out of the core 110, and a valve 115 may be formed in the outlet 114 to open and close the outlet 114.

For example, the valve 115 may be made of a material that melts when its temperature reaches a certain temperature. When the interior of the core 110 is heated to an abnormally high temperature by the nuclear fission, as shown in FIG. 3 the valve 115 may melt so that the nuclear fuel and the moderator 200 inside the core 110 can be easily discharged out of the core 110 by gravity. Therefore, when an accident occurs, the nuclear fuel and the moderator 200 are discharged out of the core 110 through the outlet 114 located in the lower part of the core 110, thereby easily shutting down and cooling the reactor.

Further, the valve 115 may be configured as a valve 115 that is controlled to be opened and closed by a controller (not shown). In this case, the valve 115 may be opened to discharge the nuclear fuel and the moderator 200 out of the core 110 based on an artificial control command of the controller to shut down and cool the reactor.

A reflector 130 may be formed to surround the core 110 and reflect neutrons produced in the core 110. The reflector 130 reflects the neutrons produced in the core 110 by the nuclear fission and prevents the neutrons from leaking out of the reactor.

In the reflector 130, a rotary control drum 140 may be provided to control an output based on the nuclear fission. A plurality of rotary control drums 140 may be disposed around the core 110 along a circumferential direction. The rotary control drum 140 may include a reflector to reflect the neutrons, and a neutron absorber 142 may be formed on one side of the rotary control drum 140 to absorb the neutrons. Thus, the neutron absorber 142 may be varied in position depending on a rotated position of the rotary control drum 140, so that the number of reflected neutrons can be controlled differently, thereby controlling the output based on the nuclear fission. For example, when the neutron absorber 142 is disposed in a direction opposite to the core 110 as shown in FIG. 4 by the rotation of the rotary control drum 140, the number of neutrons absorbed by the neutron absorber 142 is minimized and the number of reflected neutrons is maximized, thereby increasing the output.

At the top and bottom of the reactor including the core 110, shields 150 may be formed to prevent the neutrons from being released to the outside.

The heat pipe 120 is inserted in the core 110 to transfer heat generated by the nuclear reaction to the outside of the reactor.

The heat pipe 120 refers to a device that efficiently transfers heat transfer based on a phase change phenomenon of a working fluid in a metal tube. The working fluid receives heat from an evaporator inserted in the core 110, evaporates, moves to an upper condenser, and condenses, thereby releasing heat. The condensed working fluid moves back to the evaporator, in which a path from the condenser to the evaporator is formed by a porous structure (e.g., a wick) so that the fluid can move downward by capillary force. In this way, the heat pipe 120 can passively transfer heat based on a temperature difference regardless of the direction of gravity. Further, the heat pipe 120 has a high heat transfer efficiency compared to its volume due to the nature of a method using the phase change phenomenon, and is thus optimally used as a heat transfer medium in a small power source such as the micro nuclear reactor according to the disclosure.

In this case, the number, length, shape, working fluid, etc. of the heat pipe 120 may be varied depending on operating conditions (the size, output, etc. of the core 110).

The power converter 160 receives heat from the condenser of the heat pipe 120 extending outwards from the core 110 and converts thermal energy into electrical energy. The working fluid liquefied by the condensation moves back to the evaporator inside the core 110 by the capillary force and circulates inside the heat pipe 120, thereby transferring heat from the inside of the core 110 to the outside of the core 110.

The power converter 160 may employ a device such as a thermoelectric generator, a steam turbine generator, a gas turbine generator, or a Stirling engine according to environments where the micro nuclear reactor of the disclosure is used or purposes of the micro nuclear reactor.

In this case, the thermoelectric generator is a generator that uses a thermoelectric element and operates in the form of generating an electromotive force by the temperature difference based on the Seebeck effect. Unlike other power conversion devices such as the Stirling engine or the gas turbine, the thermoelectric generator includes no mechanical drivers, thereby being highly reliable, being usable for a long period of time, producing no noise, and having no effect on movement of a transporter. Furthermore, the operation and maintenance of the thermoelectric generator are easy. Because the thermoelectric generator does not produce noise, it can be applied to submersibles or exploration equipment which are required to minimize the noise production.

Therefore, the power converter 160 according to an embodiment of the disclosure employs, but is not limited to, the thermoelectric generator.

The disclosure is not limited to the foregoing embodiments, but may be embodied in various forms within the scope of the appended claims. Even various modifications made by any person having ordinary knowledge in the art to which the disclosure pertains are considered to be within the scope of the claims without departing from the gist of the disclosure claimed in the claims.

The invention claimed is:

1. A nuclear reactor comprising:

a core containing granular particles of nuclear fuel mixed with granular particles of moderator material;

a heat pipe comprising an evaporator end in the core and a condenser end out of the core;

a power converter arranged to receive heat from the condenser end of the heat pipe, wherein the power converter is operable to convert thermal energy into electrical energy;

an outlet located at a lower portion of the core, wherein the outlet when open allows for gravity discharge of the nuclear fuel and the moderator material out of the core; and a valve configured to open and close the outlet, wherein the valve is configured to open responsive to a predetermined condition, wherein the valve when open causes gravity discharge of the nuclear fuel and the moderator material from the core through the outlet.

2. The nuclear reactor of claim 1, wherein the valve is made of a material that melts upon reaching a predetermined temperature, wherein when the valve melts while closed, the outlet is opened.

3. The nuclear reactor of claim 1, further comprising a controller configured to control the valve to be opened and closed.

4. The nuclear reactor of claim 1, wherein the nuclear fuel comprises granular particles having two or more different sizes, wherein the moderator material comprises granular particles having two or more different sizes.

5. The nuclear reactor of claim 1, wherein the power converter comprises one of a thermoelectric generator using a thermoelectric element, a steam turbine generator, a gas turbine generator, or a Stirling engine.

6. The nuclear reactor of claim 1, further comprising a neutron reflector surrounding the core.

7. The nuclear reactor of claim 6, further comprising a rotary control drum located radially within the reflector, wherein the rotary control drum comprises a neutron absorber on one side thereof to absorb neutrons.

* * * * *